(12) United States Patent
Lakshmipathi et al.

(10) Patent No.: US 7,352,819 B2
(45) Date of Patent: Apr. 1, 2008

(54) MULTIANTENNA COMMUNICATIONS APPARATUS, METHODS, AND SYSTEM

(75) Inventors: Sondur Lakshmipathi, Karnataka (IN); Atanu Guchhait, West Bengal (IN); Ashim Biswas, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 718 days.

(21) Appl. No.: 10/746,973

(22) Filed: Dec. 24, 2003

(65) Prior Publication Data

US 2005/0141624 A1    Jun. 30, 2005

(51) Int. Cl.
  H04L 27/28    (2006.01)
(52) U.S. Cl. ...................................................... 375/260
(58) Field of Classification Search ................ 375/260, 375/259, 295, 347, 316, 346, 130, 140
See application file for complete search history.

(56) References Cited

U.S. PATENT DOCUMENTS

2005/0041611 A1* 2/2005 Sandhu ....................... 370/319

OTHER PUBLICATIONS

Foschini, G.J., et al., "On Limits of Wireless Communications in a Fading Environment when Using Multiple Antennas", *Wireless Personal Communications*, vol. 6, (Mar. 1998), 311-335.

* cited by examiner

*Primary Examiner*—Kevin Burd
(74) *Attorney, Agent, or Firm*—Dana B. Lemoine; Lemoine Patent Services, PLLC (57) ABSTRACT

A transmitter may transmit using OFDM-MIMO or OFDM-SDMA depending on channel characteristics.

16 Claims, 8 Drawing Sheets

MULTIANTENNA COMMUNICATIONS APPARATUS, METHODS, AND SYSTEM

FIELD

The present invention relates generally to wireless communications, and more specifically to wireless communications with multiple antennas.

BACKGROUND

Multiple-Input-Multiple-Output (MIMO) systems are communications systems in which one or more stations include multiple antennas. Channel capacity may be increased based in part on the number of antennas and the channel characteristics.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
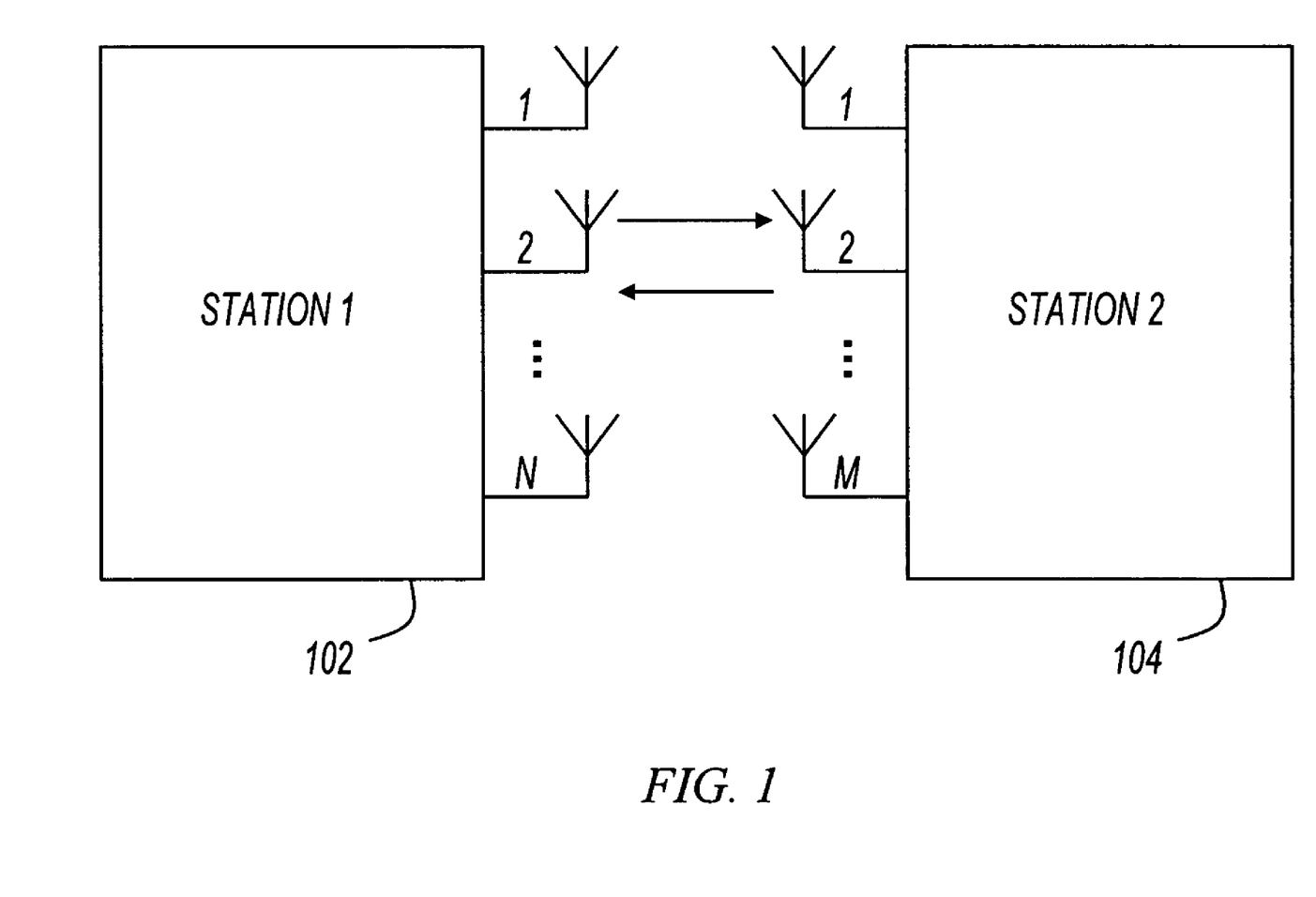
FIG. 1 shows a diagram of two wireless stations.

FIG. 1 shows a diagram of two wireless stations: station 102, and station 104. In some embodiments, stations 102 and 104 are part of a wireless local area network (WLAN). For example, one or more of stations 102 and 104 may be an access point in a WLAN. Also for example, one or more of stations 102 and 104 may be a mobile station such as a laptop computer, personal digital assistant (PDA), or the like.

In some embodiments, stations 102 and 104 may operate partially in compliance with, or completely in compliance with, a wireless network standard. For example, stations 102 and 104 may operate partially in compliance with a standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition.

Stations 102 and 104 each include multiple antennas. Station 102 includes "N" antennas, and station 104 includes "M" antennas, where N and M may be any number. Further, N and M may or may not be equal. The "channel" through which stations 102 and 104 communicate may include many possible signal paths. For example, when stations 102 and 104 are in an environment with many "reflectors" (e.g. walls, doors, or other obstructions), many signals may arrive from different paths. This condition is known as "multipath." Also for example, if a clear line-of-sight (LOS) path exists between stations 102 and 104, the signal received by a station may be dominated by the LOS component. Stations 102 and 104 utilize multiple antennas and the various channel characteristics to communicate effectively. For example, in some embodiments, stations 102 and 104 may communicate using Multiple-Input-Multiple-Output (MIMO) or Space Division Multiple Access (SDMA).

MIMO (Multiple-Input-Multiple-Output) and SDMA (Space Division Multiple Access) systems both use multiple antenna elements at either or both of the transmitter and receiver. In some embodiments, stations 102 and 104 communicate using a MIMO format when the channel characteristics are conducive to MIMO communications, and stations 102 and 104 communicate using an SDMA format when the channel characteristics are conducive to SDMA communications.

In some embodiments, channel characteristics not conducive to one format (SDMA or MIMO) may be conducive to the other. For example, MIMO systems offer higher capacities when the multipath arrivals at the receiving antennas are uncorrelated. Each uncorrelated path may be exploited as a separate channel, analogous to the existence of several parallel independent channels existing between a transmitter and a receiver. Significant uncorrelated multipath, also referred to as "rich scattering," may occur with non-line of sight (NLOS) communication.

In contrast to MIMO systems, SDMA systems offer higher capacities in LOS conditions with coherent multipath and narrow angle spread. The coherent combining of the signal with appropriate phase delay for various dominant multipaths results in the enhancement of the signal strength and the throughput. The increase in signal-to-noise ratio (SNR) occurs as the energy is focused in to a fine beam in the direction of a receiver from the transmitter. Additionally, SDMA offers frequency reuse, in part because multiple stations may be multiplexed spatially through beamforming.

In some embodiments, stations 102 and 104 may communicate using orthogonal frequency division multiplexing (OFDM). Multipath may introduce frequency selective fading which may cause impairments like inter-symbol interference (ISI). OFDM is effective at combating frequency selective fading in part because OFDM breaks the channel into small subchannels such that each subchannel exhibits a more flat channel characteristic. Scaling appropriate for each subchannel may be implemented to correct any attenuation caused by the subchannel. Further, the data carrying capacity of each subchannel may be controlled dynamically depending on the fading characteristics of the subchannel.

In some embodiments, stations 102 and 104 may communicate using a combination of OFDM and MIMO (referred to as OFDM-MIMO), and may also communicate using a combination of OFDM and SDMA (referred to as OFDM-SDMA). Stations 102 and 104 may dynamically switch between OFDM-MIMO and OFDM-SDMA depending on the channel characteristics. For example, when the channel exhibits rich scattering with uncorrelated multipaths, stations 102 and 104 may communicate using OFDM-MIMO. Also for example, when the channel exhibits correlated multipaths with narrow angle spread, stations 102 and 104 may switch over to OFDM-SDMA. Various mechanisms for channel estimation, exchange of pre-filtering matrices, pre-filtering methods in case of reduced rank channel, and change over from MIMO to SDMA in a highly correlated environment are described below with reference to the figures that follow.

Figure 2:
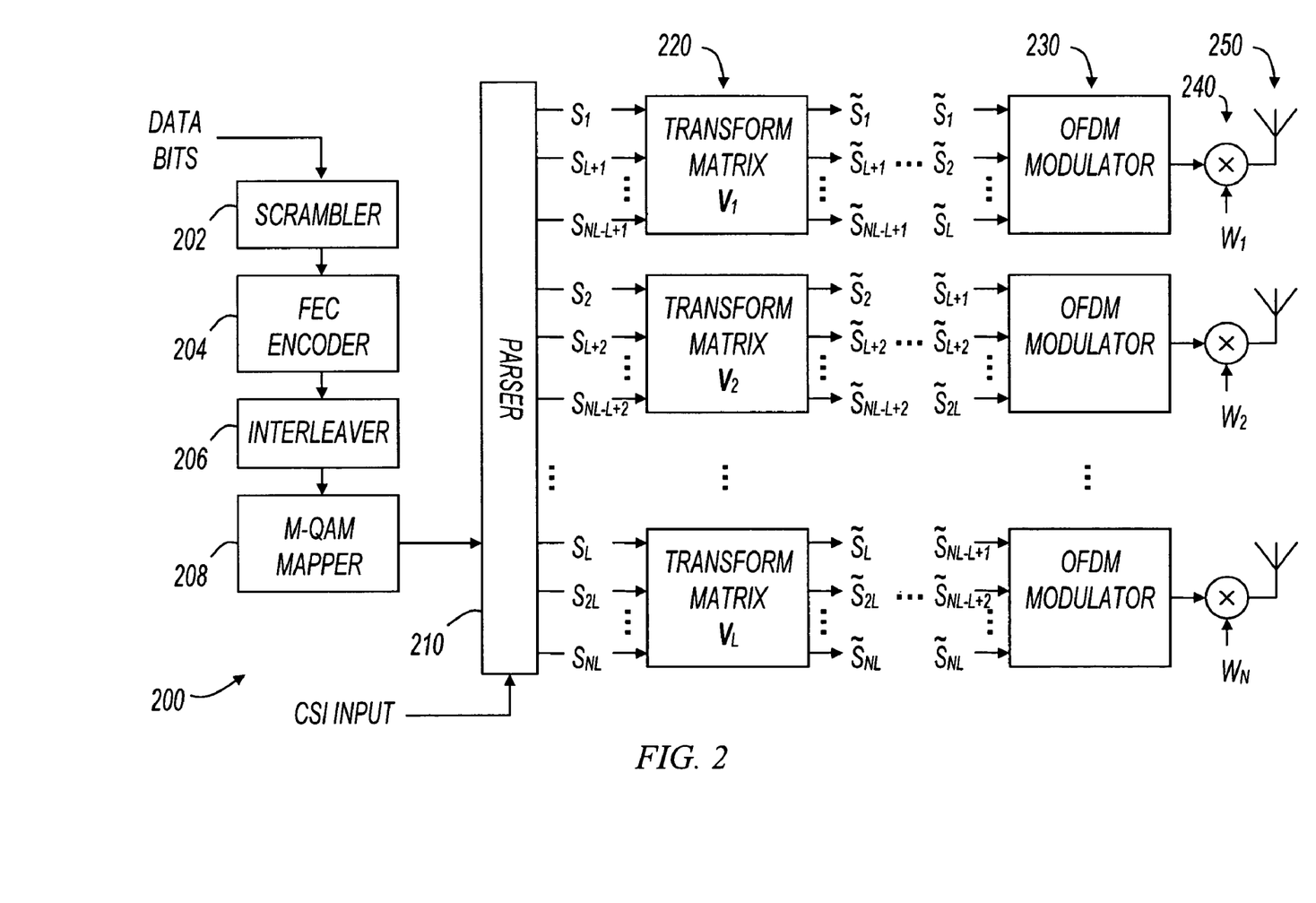
FIG. 2 shows a diagram of a transmitter.

FIG. 2 shows a diagram of a transmitter. Transmitter 200 is an OFDM-MIMO/SDMA transmitter capable of transmitting either OFDM-MIMO or OFDM-SDMA. Transmitter 200 includes scrambler 202, forward error correction (FEC) encoder 204, interleaver 206, and M-ary quadrature amplitude modulation (QAM) mapper 208. Transmitter 200 also includes parser 210, transform mechanisms 220, OFDM modulators 230, signal weighting mechanisms 240, and antennas 250.

In operation, transmitter 200 receives data bits, scrambles them, and then the scrambled bits are encoded, interleaved, and mapped onto an M-ary QAM signal constellation. In some embodiments, parser 210 may be an intelligent parser that receives channel state information (CSI), and may control the bit rate depending on the channel characteristics. Parser 210 parses the QAM signals output from M-QAM mapper 208 into L subsets, where L is the number of subcarriers used in the OFDM modulation. The first subset includes signals to be modulated by the first subcarrier in OFDM modulation, the second subset includes signals to be modulated by the second subcarrier, and so on for the other subsets, up to $L^{th}$ subcarrier. The L signal subsets are transformed by transform mechanisms 220 using pre-filtering matrices as shown in FIG. 2. In some embodiments, the pre-filtering matrices are obtained from the receiver as the feedback information on the channel state information. The pre-filtered signals are rearranged in to N subsets for OFDM modulation, weighting, and transmission by antennas 250. OFDM modulation is performed by OFDM modulators 230, and weighting is performed by weighting mechanisms 240. Training sequences, channel estimation, and pre-filtering matrices are discussed further below with reference to the remaining figures.

As shown in FIG. 2, transmitter 200 includes N antennas, where N may be any number. In some embodiments, transmitter 200 is used within a station such as station 102 or station 104 (FIG. 1). Further, in some embodiments, transmitter 200 is coupled with a receiver that performs the reverse of the operations shown in FIG. 2. For example, a receiver may be coupled to antennas 250, and the receiver may include OFDM demodulators, transform mechanisms, and blocks to perform the reverse operations of parser 210, M-QAM mapper 208, interleaver 206, FEC encoder 204, and scrambler 202.

The various items shown in FIG. 2 may be implemented in many different ways. For example, in some embodiments, portions of transmitter 200 are implemented in dedicated hardware, and portions are implemented in software. In other embodiments, all of transmitter 200 is implemented in hardware. The present invention is not limited in this respect.

Figure 3:
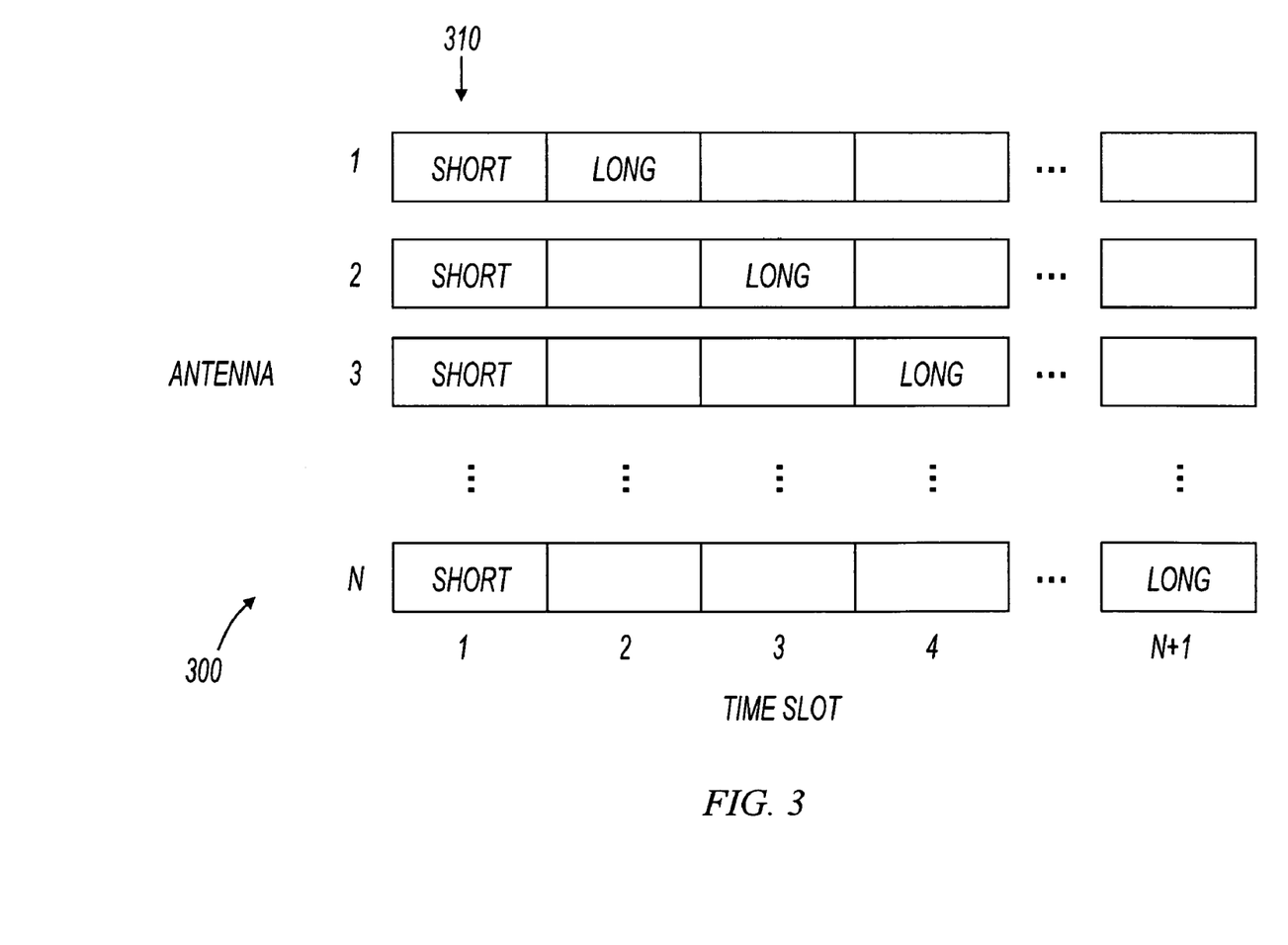
FIG. 3 shows training sequences.
Figure 4:
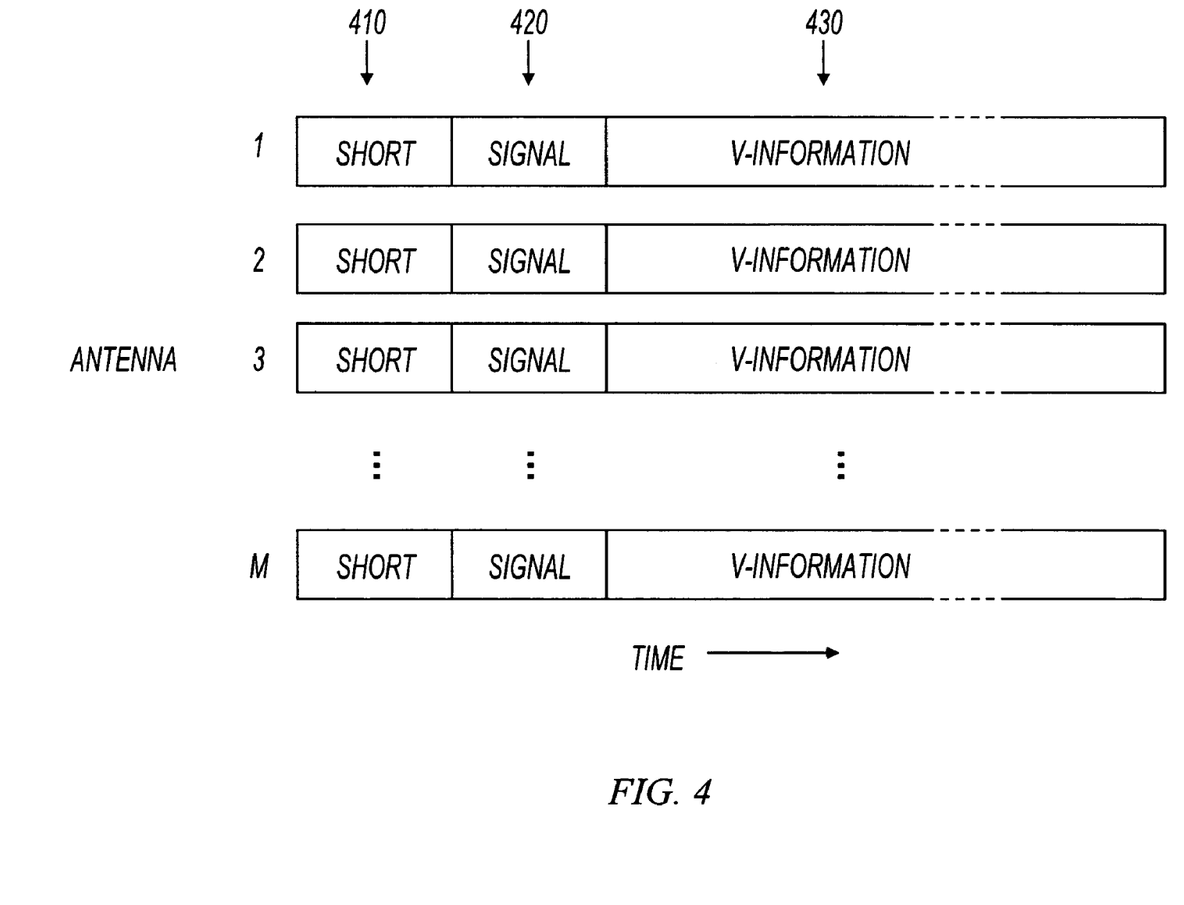
FIG. 4 shows the transmission of channel state information.

The design of training sequences, channel estimation, and pre-filtering matrices are now described with reference to FIGS. 3 and 4. FIG. 3 shows the transmission of training sequences from one station to another, and FIG. 4 shows the transmission of channel state information back to the first station. As described above with reference to FIG. 2, blocks of binary data bits are scrambled, convolutionally encoded, interleaved and mapped on to QAM signals. In some embodiments, these operations are performed in compliance with IEEE 802.11.

Training Sequences

The following discussion assumes a transmitter with N antennas and a receiver with M antennas, but this is not a limitation of the present invention. When example embodiments are described, stations 102 and 104 (FIG. 1) may be referred to as example stations. For example, the following discussion of training sequences may be illustrated by station 102 transmitting training sequences from N antennas to station 104.

Let the set of mapped signals $(s_1, s_2, \ldots, s_L)$ correspond to one OFDM symbol, where L is the total number of subcarriers. 2N such OFDM symbol sets are considered for training, where N is the number of transmitting antennas. In some embodiments, a group of two OFDM symbols are arranged for transmission by each antenna. For N antennas there are N "grouped-symbols" as follows:

$$[\{(s_1,s_2,\ldots,s_L),(s_1,s_2,\ldots,s_L)\}_1,\{(s_1,s_2,\ldots,s_L),(s_1,s_2,\ldots,s_L)\}_2,\ldots,\{(s_1,s_2,\ldots,s_L),(s_1,s_2,\ldots,s_L)\}_N]$$

The 2N OFDM symbols (or N OFDM grouped-symbols) are part of a preamble for MIMO channel estimation, frequency offset estimation, and timing recovery. In the above 2N OFDM symbol sequence the $n^{th}$ group in the curly braces, $\{(s_1,s_2,\ldots,s_L),(s_1,s_2,\ldots,s_L)\}_n$, is meant for transmission by the $n^{th}$ transmitting antenna in the manner shown in FIG. 3.

As shown in FIG. 3, the training sequence 300 includes short symbols 310 transmitted simultaneously by all N antennas, and the N long group-symbol sequences are sequentially transmitted by the respective transmitting antennas. For example, at the end of the short training sequence transmission, the first group is transmitted by the first antenna, the second group is transmitted by the second antenna and so on for all the N group-symbols. Note that all but the $n^{th}$ transmitting antenna is silent during the transmission of the $n^{th}$ group-symbol.

In some embodiments, the short symbols may be of the type used in the IEEE 802.11a physical layer convergence procedure (PLCP) preamble, but this is not a limitation of the present invention. For example, the short symbols may include ten symbols as in IEEE 802.11a, or may include more or less than ten symbols. Further, in some embodiments, each of the OFDM grouped-symbols may replace the two long symbols in the PLCP preamble of IEEE 802.11a, such that each of the N antennas transmits the short symbols in compliance with IEEE 802.11a, and also transmit one of the OFDM grouped-symbols.

Channel Estimation

For the first OFDM symbol $(s_1,s_2,\ldots,s_L)$ in the $n^{th}$ group-symbol transmission, the following equations may be obtained at the M receivers of station 104 after the OFDM demodulation. All the signals and channel coefficients are assumed to be in the frequency domain. The received signals at all the M receiving antennas for $l^{th}$ subcarrier can be written as:

$$\begin{bmatrix} y_{1,n,l} \\ y_{2,n,l} \\ \vdots \\ \vdots \\ y_{M-1,n,l} \\ y_{M,n,l} \end{bmatrix} = \begin{bmatrix} H_{1,1,l} & H_{1,2,l} & \cdots & H_{1,N,l} \\ H_{2,1,l} & H_{2,2,l} & \cdots & H_{2,N,l} \\ \vdots & \vdots & & \vdots \\ H_{M-1,1,l} & H_{M-1,2,l} & \cdots & H_{M-1,N,l} \\ H_{M,1,l} & H_{M,2,l} & \cdots & H_{M,N,l} \end{bmatrix} \begin{bmatrix} 0 \\ \vdots \\ 0 \\ s_{n,l} \\ 0 \\ \vdots \\ 0 \end{bmatrix} + \begin{bmatrix} \eta_{1,n,l} \\ \eta_{2,n,l} \\ \vdots \\ \vdots \\ \eta_{M-1,n,l} \\ \eta_{M,n,l} \end{bmatrix} \quad (1)$$

In the left hand side (LHS) of the above equation, the first subscript $1, 2, \ldots, M$ indicates the receiving antennas, n indicates the $n^{th}$ training group, and l indicates the $l^{th}$ subcarrier. The subscripts for the noise vector at the far right of the right hand side (RHS) denote the same. The same subscript definitions also apply to the signal vector which has all zeros except for one element. For the channel matrix the first and second subscripts denote the receiving and transmitting antennas $1, 2, \ldots, M$ and $1, 2, \ldots, N$, respectively.

Equation (1) can be written in matrix form as $$y_{n,l} = H_l e_n s_{n,l} + \eta_{n,l} \text{ where } e_n = [0 \ldots 0\ 1\ 0 \ldots 0]^T \quad (2)$$

The channel matrix $H_l$ represents the channel state information (CSI) matrix for the $l^{th}$ subcarrier. $\eta_{m,n,l}$ is assumed to be spatially and temporally uncorrelated noise.

$$E[\eta_{i,n,l}\eta_{j,n,l}] = E[\eta_{m,i,l}\eta_{m,j,l}] = \delta_{i,j}, \text{ where } \delta_{i,j}=1, i=j;$$
$$\delta_{i,j} = 0, i \neq j. \quad (3)$$

Equation (2) reduces to $$y_{n,l} = h_{n,l} s_{n,l} + \eta_{n,l} \quad (4)$$

where $$h_{n,l} = [H_{1,n,l} H_{2,n,l} \ldots H_{M,n,l}]^T \quad (5)$$

The estimated subchannel vector for the $l^{th}$ subcarrier during the transmission by $n^{th}$ transmitting antenna is $$\hat{h}_{n,l} = y_{n,l}/s_{n,l} \quad (6)$$

The above subchannel estimate may be performed for the first OFDM symbol $(s_1, s_2, \ldots, s_L)$ in the $n^{th}$ OFDM group-symbol. Since the transmission of second OFDM symbol in the $n^{th}$ OFDM group-symbol may be identical to the first, another estimate of the above may be obtained. The two estimates may be averaged, and the average of the two estimates may represent the estimated subchannel vector for $l^{th}$ subcarrier as given in Equation (6).

Subchannel estimates may be obtained through the process represented by Equation (1)-(6) for all the subcarriers $l=1, 2, \ldots, L$, and are denoted as $\hat{h}_{n,1}, \hat{h}_{n,2}, \ldots, \hat{h}_{n+1,L}$. After transmission of the OFDM group-symbol by the $n^{th}$ antenna, the OFDM group-symbol is transmitted by the $(n+1)^{th}$ antenna. All the subchannel vector estimates may be obtained in the same way, and are denoted as $\hat{h}_{n+1,1}, \hat{h}_{n+1,2}, \ldots, \hat{h}_{n+1,L}$.

At the end of the transmission by the $N^{th}$ antenna, the subchannel estimates are $\hat{h}_{N,1}, \hat{h}_{N,2}, \ldots, \hat{h}_{N,L}$. Putting together all the estimated channel vectors obtained during the transmission by the antennas sequentially as shown in FIG. 3 results in the following sets: $\{\hat{h}_{1,1}, \hat{h}_{1,2}, \ldots, \hat{h}_{1,L}\}$, $\{\hat{h}_{2,1}, \hat{h}_{2,2}, \ldots, \hat{h}_{2,L}\}, \ldots, \{\hat{h}_{n,1}, \hat{h}_{n,2}, \ldots, \hat{h}_{n,L}\}, \ldots, \{\hat{h}_{N,1}, \hat{h}_{N,2}, \ldots, \hat{h}_{N,L}\}$. Picking up the first subchannel vector from each set and arranging them in the following matrix $$\hat{H}_1 = [\hat{h}_{1,1} \hat{h}_{2,1} \ldots \hat{h}_{N,1}] \quad (7)$$

yields the channel matrix corresponding to the first subcarrier. For the remaining subcarriers $2, 3, \ldots, L$, matrices $\hat{H}_2, \ldots, \hat{H}_l, \ldots, \hat{H}_L$ are obtained in the same manner. The L subchannel matrices obtained during the transmission of the N OFDM group-symbols of the training sequence are $\hat{H}_1, \hat{H}_2, \ldots, \hat{H}_l, \ldots, \hat{H}_L$, where $$\hat{H}_l = [\hat{h}_{1,l} \hat{h}_{2,l} \ldots \hat{h}_{N,l}]. \quad (8)$$

Pre-Filtering Matrices

The channel matrix $\hat{H}_l$ for the $l^{th}$ subcarrier is a M×N matrix. In some embodiments, the choice of transmission strategy is dependent on the physical characteristics of the channel. For example, when the channel disperses the signals from N transmitting antennas into uncorrelated transmission paths resulting in full rank channel matrices $\hat{H}_l$, $l=1, 2, \ldots, L$, an OFDM-MIMO transmission strategy may be chosen.

The condition number of the channel matrices is dependent on the richness of the incoherent multipath environment. The condition number may be derived from the singular value decomposition (SVD) of the channel matrix, in which the distribution of the singular values will indicate the amount of power distribution into different incoherent multipaths. The singular value decomposition of $\hat{H}_l$ is given by $$\hat{H}_l = \hat{U}_l \hat{\Sigma}_l \hat{V}_l^H. \quad (9)$$

The size of matrix $\hat{H}_l$ is M×N, the size of left singular matrix $\hat{U}_l$ is M×M, size of diagonal matrix $\hat{\Sigma}_l$ is M×N, and size of right singular matrix $\hat{V}_l^H$ is N×N, assuming M≧N. The diagonal elements of $\hat{\Sigma}_l$ are arranged as $$\hat{\Sigma}_l = \begin{bmatrix} \mu_{1,l} & 0 & \cdots & 0 \\ 0 & \mu_{2,l} & \cdots & 0 \\ \vdots & \vdots & & \vdots \\ 0 & 0 & \cdots & \mu_{N,l} \\ 0 & 0 & \cdots & 0 \\ \vdots & \vdots & \cdots & \vdots \\ 0 & 0 & \cdots & 0 \end{bmatrix} \quad (10)$$

where the diagonal elements $\mu_{n,l}$, $n=1, 2, \ldots, N$ are singular values of $\hat{H}_l$ and indicate the power of the transmission signals in the respective multipaths. Depending on the rank of the subchannel matrices, we consider the following three cases for the discussion: 1) full rank channel matrix, 2) not all subchannel matrices are full rank, and 3) rank one matrix.

Case 1: Full Rank Channel Matrix

Assume that all the subchannel matrices $\hat{H}_1, \hat{H}_2, \ldots, \hat{H}_l, \ldots, \hat{H}_L$ are strong full rank matrices where the ratio $\mu_{1,l}/\mu_{N,l} \approx 1$. As used herein, the term "strong" on the rank of a matrix is used to indicate that the singular values are substantially evenly distributed, e.g. the condition number is approximately equal to unity. Strong full rank subchannel matrices are indicative of rich scattering with uncorrelated multipath. In some embodiments, when this condition occurs, channel state information is sent back to the transmitting station to allow pre-filtering of data for OFDM-MIMO transmission. Various embodiments of transmitting channel state information are represented in FIG. 4.

FIG. 4 shows the transmission of channel state information. Example embodiments represented by FIG. 4 transmit from M antennas. In some embodiments, this may correspond to station 104 transmitting channel state information back to station 102. Included in FIG. 4 are short symbols 410, signal fields 420, and V-information 430. V-information 430 represents a field that includes the data pertaining to pre-filtering matrices $\hat{V}_l^H$, l=1, . . . , L. Short symbols 410 and signal fields 420 precede the V-Information field. In some embodiments, the short symbols are used for synchronization at station 102. Also in some embodiments, the signal field includes information on the number of $\hat{V}_l$ encoded in each antenna transmission, data rate, data packet length, and the like. In some embodiments, the short symbols are omitted, and in some embodiments, the signal fields are omitted.

As shown in FIG. 4, after performing channel estimation, station 104 feeds back channel state information to station 102 in the form of pre-filtering matrices $\hat{V}_l^H$, l=1, . . . , L. After receiving the channel state information, station 102 may use this for pre-filtering using transform mechanisms 220 shown in FIG. 2. In some embodiments, the information is transmitted as OFDM symbols with BPSK modulation. In these embodiments, for a M×N MIMO system with L subcarriers in OFDM, the number of bits (assuming 16-bit fixed-point format) to transmit is $$\frac{(L \times M \times N \times 16)}{24} = \frac{2 \times L \times M \times N}{3}.$$

Accordingly, to convey the V-information field, the number of transmitted OFDM symbols at station 104 per antenna is $$\frac{2 \times L \times M \times N}{3} \times \frac{1}{M} = \frac{2 \times L \times N}{3},$$

with the assumption of half rate convolutional encoding.

After the channel state information has been received at the original transmitter (in this example, at station 102), the channel state information may be utilized to pre-filter data to be transmitted. Uncorrelated transmission of the data signals from the transmitting antennas can be realized by pre-filtering the signals by right singular matrix $\hat{V}_l$ at the transmitter and post-filtering of the received signals by the left singular matrix $\hat{U}_l$ at the receiver. Further, weighting mechanisms such as weighting mechanisms 240 may provide uniform weights to all OFDM modulated signals prior to transmission.

The preceding discussion of channel estimation treats the "forward" channel from station 102 to station 104. Station 102 transmits a training sequence, station 104 estimates the forward channel and transmits back channel state information. The channel state information is then used to pre-filter the data prior to transmission, and post-filter the data after reception. In some embodiments, the forward and reverse channels may not be symmetrical. In some of these embodiments, the forward and reverse channels may be estimated in the respective stations and channel state information (CSI) may be sent back to the transmitting station. The forward channel may be estimated when one station receives a training sequence from another station, and the reverse channel may be estimated when a training sequence is transmitted in the opposite direction. Various embodiments of forward and reverse channel estimation are described below with reference to FIG. 5.

Figure 5:
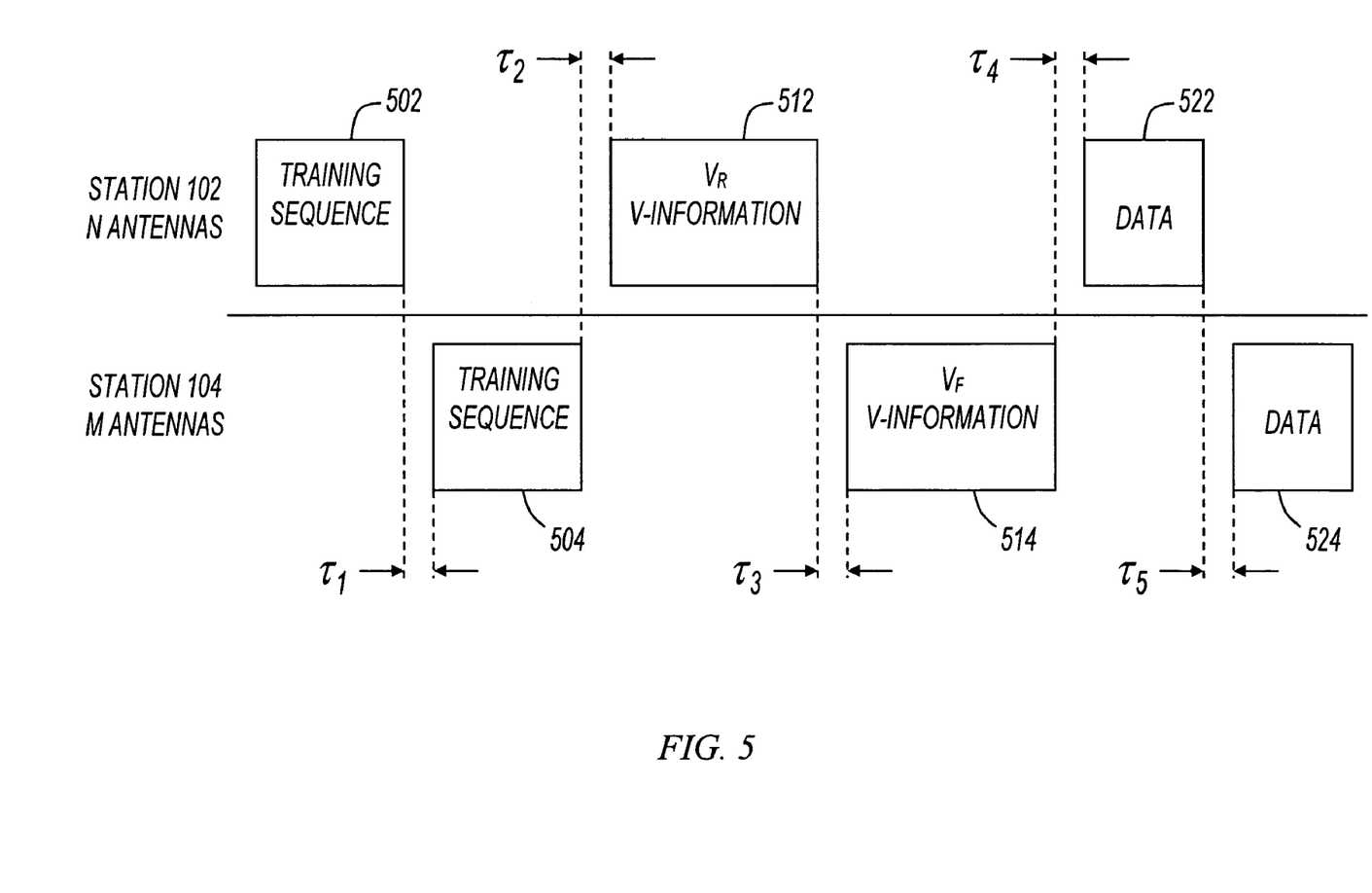
FIG. 5 shows a communications sequence between two wireless stations.

FIG. 5 shows a communications sequence between two wireless stations. The communications sequence includes training sequence 502, channel state information 512, and data 522 transmitted by station 102 having N antennas, and received by station 104 having M antennas. The communications sequence also includes training sequence 504, channel state information 514, and data 524 transmitted by station 104 and received by station 102. This discussion represents the forward channel matrix for all subcarriers as $\hat{H}_F = [\hat{H}_{F1} \hat{H}_{F2} \ldots \hat{H}_{FL}]$ when the transmission is from station 102 to station 104 and similarly, the reverse channel matrix for all subcarriers as $\hat{H}_R$ when the transmission is from station 104 to station 102.

In some embodiments, training sequence 502 may be a training sequence such as training sequence 300 (FIG. 3) transmitted from N antennas at station 102. In some embodiments, station 104 does not have a priori knowledge of the number of transmitting antennas at station 102. In these embodiments, station 104 receives the training sequence 502 and calculates N from the number of received long sequences. Station 104 may estimate the subchannel matrices $\hat{H}_F$ from the received long training sequence, and determine SVDs of estimated subchannel matrices $\hat{H}_F = \{\hat{U}_{F1} \hat{\Sigma}_{F1} \hat{V}_{F1}^H, \hat{U}_{F2} \hat{\Sigma}_{F2} \hat{V}_{F2}^H, \ldots, \hat{U}_{FL} \hat{\Sigma}_{FL} \hat{V}_{FL}^H\}$. Subscript F indicates the transmission in the forward direction (e.g., from station 102 to station 104).

The training sequence at 504 operates similarly as the training sequence at 502, except that station 104 transmits the training sequence to allow estimation of the reverse channel. In some embodiments, training sequence 504 may be a training sequence such as training sequence 300 (FIG. 3), except that the number of transmitting antennas and the number of long sequences is M rather than N.

In some embodiments, station 102 does not have a priori knowledge of the number of transmitting antennas at station 104. In these embodiments, station 102 receives the training sequence 504 and calculates M from the number of received long sequences. Station 102 may estimate the subchannel matrices $\hat{H}_R$ for all the subchannels l=1, 2, . . . , L, and determine SVDs of all estimated subchannels $\hat{H}_R = \{\hat{U}_{R1} \hat{\Sigma}_{R1} \hat{V}_{R1}^H, \hat{U}_{R2} \hat{\Sigma}_{R2} \hat{V}_{R2}^H, \ldots, \hat{U}_{RL} \hat{\Sigma}_{RL} \hat{V}_{RL}^H\}$. Subscript R indicates the transmission in the reverse direction (e.g., from station 104 to station 102).

In some embodiments, after training sequences are transmitted in both the forward and reverse directions, channel state information is exchanged. For example, channel state information 512 in the form of $\hat{V}_{Rl}^H$, l=1, . . . , L, is fed back from station 102 to station 104 to allow pre-filtering to be performed at station 104. In some embodiments, channel state information 512 takes the form shown in FIG. 4. Further, in some embodiments, the information is transmitted as OFDM symbols with BPSK modulation. In these embodiments, for a M×N MIMO system with L subcarriers in OFDM, the number of bits (assuming 16-bit fixed-point format) required to transmit is $$\frac{(L \times M \times N \times 16)}{24} = \frac{2 \times L \times M \times N}{3}.$$

Accordingly, to convey the V-information field, the number of transmitted OFDM symbols at station 102 per antenna is $$\frac{2 \times L \times M \times N}{3} \times \frac{1}{N} = \frac{2 \times L \times N}{3},$$

with the assumption of half rate convolutional encoding.

Station 104 may then extract the $\{\hat{V}_{R1}\}$ information from the received signal, and while extracting the pre-filtering information, station 104 equalizes the subchannels by performing the inverse channel operation as $$\hat{s}_l = \hat{V}_{Fl}\hat{\Sigma}_{Fl}^H \hat{U}_{Fl}^H r_l, \text{ where } r_l = H_l s_l + \eta_l, \, l=1,2,\ldots,L \qquad (11)$$

where $s_l$, $l=1,2,\ldots,L$ are the M-ary QAM signals that contain the pre-filtering matrices information.

Channel state information 514 is transmitted from station 104 to station 102. This transmission is similar to that described above with reference to channel state information 512, except it is transmitted with M antennas rather N antennas, and the V-information exchanged is for the forward link, $\{\hat{V}_{Fl}\}$, $l=1,\ldots,L$, rather than the reverse link.

The preceding discussion regarding a forward link having N transmitting antennas and a reverse link having M transmitting antennas is provided as an example only. In some embodiments, M>N, and in other embodiments, N>M. In still further embodiments, M=N. Any number of transmitting antennas and any number of receiving antennas may be utilized on any station without departing from the scope of the present invention.

After the training sequences and channel state information are transmitted, the actual data transmission may take place at 522 and 524. In some embodiments, pre-filtering is performed using the appropriate V-information before the OFDM modulation. For example, the $l^{th}$ pre-filtering may be performed on those signals corresponding to the $l^{th}$ subcarrier. After pre-filtering, the signals are again regrouped for OFDM modulation as shown in FIG. 2. In some embodiments, OFDM modulation includes the IFFT operation and pre-pending of the cyclic prefix. On the receiver side after the OFDM demodulation, the following equalization may be performed on all subcarrier signals.

$$\hat{s}_l = \hat{\Sigma}_{Fl}^H \hat{U}_l^H r_l, \text{ where } r_l = H_l \tilde{s}_l + \eta_l = U_l \Sigma_{Fl} V_l^H \tilde{s}_l + \eta_l, \text{ and}$$
$$\tilde{s}_l = \hat{V}_l s_l, l=1,2,\ldots,L \qquad (12)$$

where $s_l$, $l=1,2,\ldots,L$ are the M-ary QAM signals that contain the data.

The delays $\tau_1$, $\tau_2$, $\tau_3$, $\tau_4$, and $\tau_5$ are the delays used to process the received data at the respective stations. In some embodiments, the upper and lower limits of these delays may be system design parameters.

In the presence of rich scattering in the channel, the strengths of the multipaths are comparable. The above discussed signal processing can be applied to achieve increased channel capacity. Uncorrelated transmission of the signals from the transmitting antennas can be realized by pre-filtering the signals by right singular matrix $\hat{V}_l$ at the transmitter and post filtering of the received signals by the left singular matrix $\hat{U}_l$ at the receiver. Since the subcarrier channels are nearly flat fading channels full capacity can be realized if the subchannel matrices possess the full rank property, and both transmitter and receiver have knowledge of $\hat{H}_1, \hat{H}_2, \ldots, \hat{H}_L$. In some embodiments, $\hat{H}_1, \hat{H}_2, \ldots, \hat{H}_L$ for both forward and reverse channels are updated periodically. For example, in some embodiments, stations may periodically transmit channel state information. Also in some embodiments, stations may request channel state information from another station.

Case 2: Not All Subchannel Matrices Full-Rank

In a situation where the channel does not give rise to the strong full rank channel matrix (as in case 1, above), some of the multipath components may be coherent or may not exist in the desired directions and the singular values corresponding to those directions would be zero or close to zero. Subsequently, the channel capacity reduces depending on the number of incoherent multipaths. In the case of OFDM systems there is a likelihood that all the channel matrices may not result in the reduced rank subchannel matrices. In some of these embodiments, one subchannel matrix $\hat{H}_k$ may be selected to perform pre-filtering on all signals at the transmitter. For example, a subchannel matrix $\hat{H}_k$ that is strongly full-rank compared to all other subchannel matrices may be selected. Pre-filtering all the transmission signals $s_l$, $l=1,2,\ldots,L$ by the same pre-filtering matrix $\hat{V}_k$ instead of $\{\hat{V}_l\}$, $l=1,\ldots k-1, k+1, \ldots, L$, enables the launch of signals in to the desired multipaths, resulting in improved subchannel matrix properties. This process can be carried out even in the case of non-full rank channel matrix by selecting the subchannel matrix that has highest ranking. The resulting subchannel matrices with this pre-filtering will improve the subchannel matrix properties as the pre-filtering by $\hat{V}_k$ forces the signals to follow the desired antenna patterns so that the subchannel matrices will improve in their rank property.

Case 3: Rank-one Channel Matrices

All the subchannel matrices will result in rank-one matrices if a strong LOS path exists between station 102 and station 104. Direct paths between stations can be often seen in the hotspots where access points and mobile stations have direct visibility. In such situations the system may not support the MIMO based transmission. In these embodiments, transmission may be immediately switched over to SDMA based on the information obtained by decomposition of the subchannel matrices. The signals are appropriately weighted by the weighting coefficients as shown in FIG. 2 and the pre-filtering matrices reduce to identity matrices. Weighting coefficients are given by $$w = [w_1 \, w_2 \ldots w_N]^T \qquad (13)$$

They may be estimated from the subchannel matrices or from the received signals. In some embodiments, as the knowledge of the subchannel matrices and their rank properties are known, the desired weighting coefficients may be estimated in the following manner. Arrange the subchannel matrices as given in the following equation.

$$G = [\hat{H}_1^T, \hat{H}_2^T, \ldots, \hat{H}_L^T] \qquad (14)$$

In the perfect LOS conditions G will be close to a rank-one matrix. QR decomposition of G is $$G = QR \qquad (15)$$

where Q is the orthonormal matrix, and R is the upper triangular matrix with the first nonzero diagonal element and remaining diagonal elements approximately zero. In some embodiments, the first column of Q represents the desired weighting vector. Transmission of the same OFDM symbol with appropriate phase delay or weighting is done to achieve the directional beamforming. Unlike in MIMO systems the transmission of independent OFDM signal transmission from N antennas is not possible, but the signal power and spatial multiplexing may be increased. The signal to noise ratio (SNR) may be further enhanced if the coherent multipaths can be estimated and combined. For this, multiple weight vectors may be estimated corresponding to the dominant multipath components.

Figure 6:
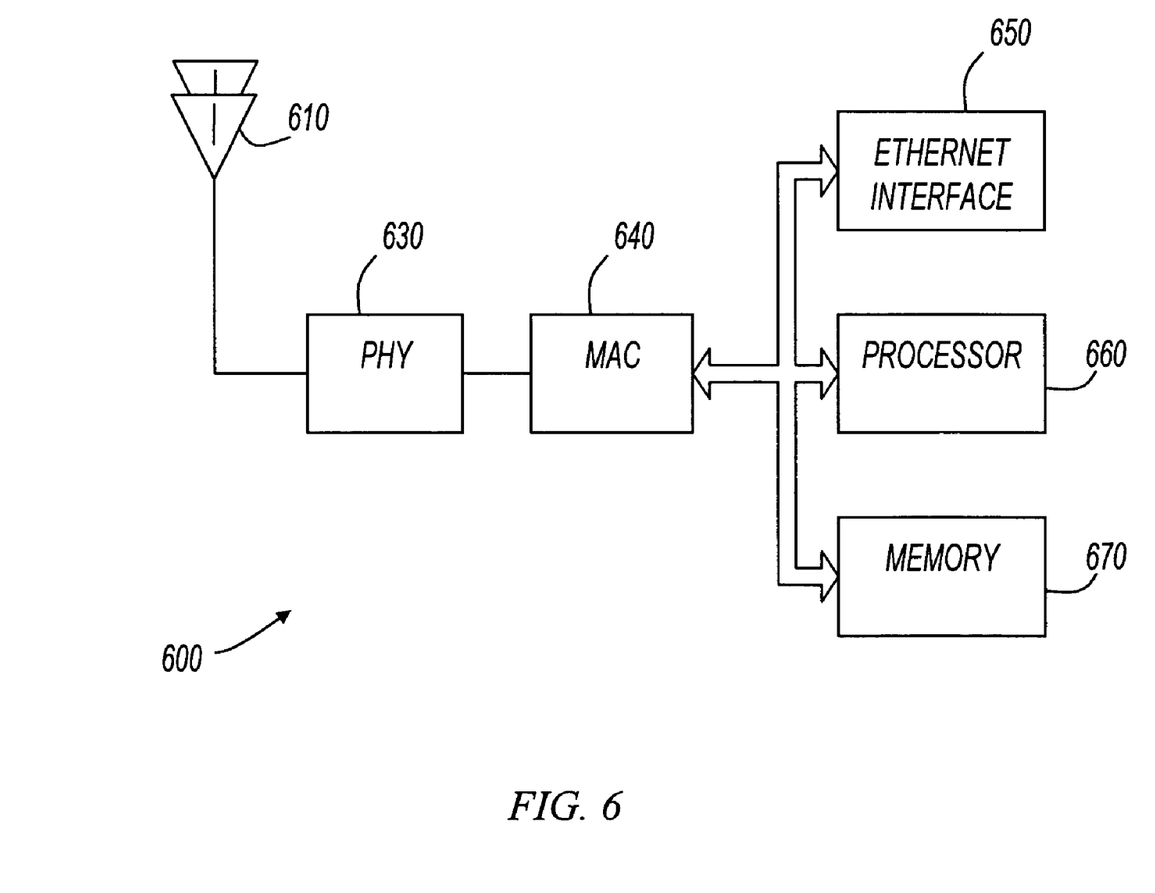
FIG. 6 shows a system diagram in accordance with various embodiments of the present invention.

FIG. 6 shows a system diagram in accordance with various embodiments of the present invention. Electronic system 600 includes antennas 610, physical layer (PHY) 630, media access control (MAC) layer 640, Ethernet interface 650, processor 660, and memory 670. In some embodiments, electronic system 600 may be a station capable of communication using OFDM-MIMO or OFDM-SDMA. For example, electronic system 600 may be utilized in a wireless network as station 102 or station 104. Also for example, electronic system 600 may be a transmitter capable of pre-filtering signals, or may be a receiver capable of performing channel estimation.

In some embodiments, electronic system 600 may represent a system that includes an access point or mobile station as well as other circuits. For example, in some embodiments, electronic system 600 may be a computer, such as a personal computer, a workstation, or the like, that includes an access point or mobile station as a peripheral or as an integrated unit. Further, electronic system 600 may include a series of access points that are coupled together in a network.

In operation, system 600 sends and receives signals using antennas 610, and the signals are processed by the various elements shown in FIG. 6. Antennas 610 may be an antenna array or any type of antenna structure that supports SDMA or MIMO.

Physical layer (PHY) 630 is coupled to antennas 610 to interact with a wireless network. PHY 630 may include circuitry to support the transmission and reception of radio frequency (RF) signals. For example, in some embodiments, PHY 630 includes an RF receiver to receive signals and perform "front end" processing such as low noise amplification (LNA), filtering, frequency conversion or the like. Further, in some embodiments, PHY 630 includes transform mechanisms to support MIMO signal processing, and beamforming circuitry to support SDMA signal processing. Also for example, in some embodiments, PHY 630 includes circuits to support frequency up-conversion, and an RF transmitter.

Media access control (MAC) layer 640 may be any suitable media access control layer implementation. For example, MAC 640 may be implemented in software, or hardware or any combination thereof. In some embodiments, a portion of MAC 640 may be implemented in hardware, and a portion may be implemented in software that is executed by processor 660. Further, MAC 640 may include a processor separate from processor 660.

Figure 7:
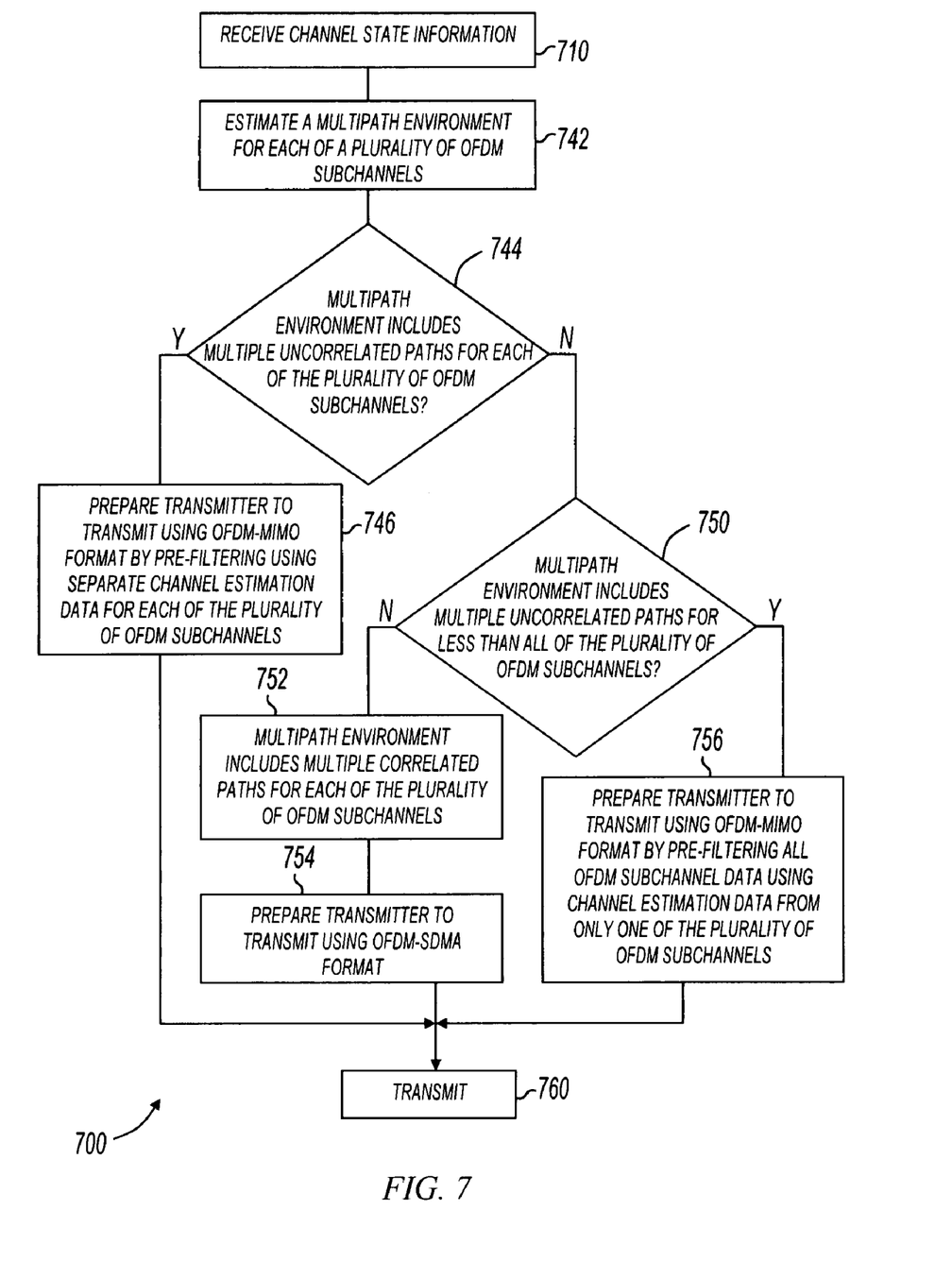
FIGS. 7 and 8 show flowcharts in accordance with various embodiments of the present invention.
Figure 8:
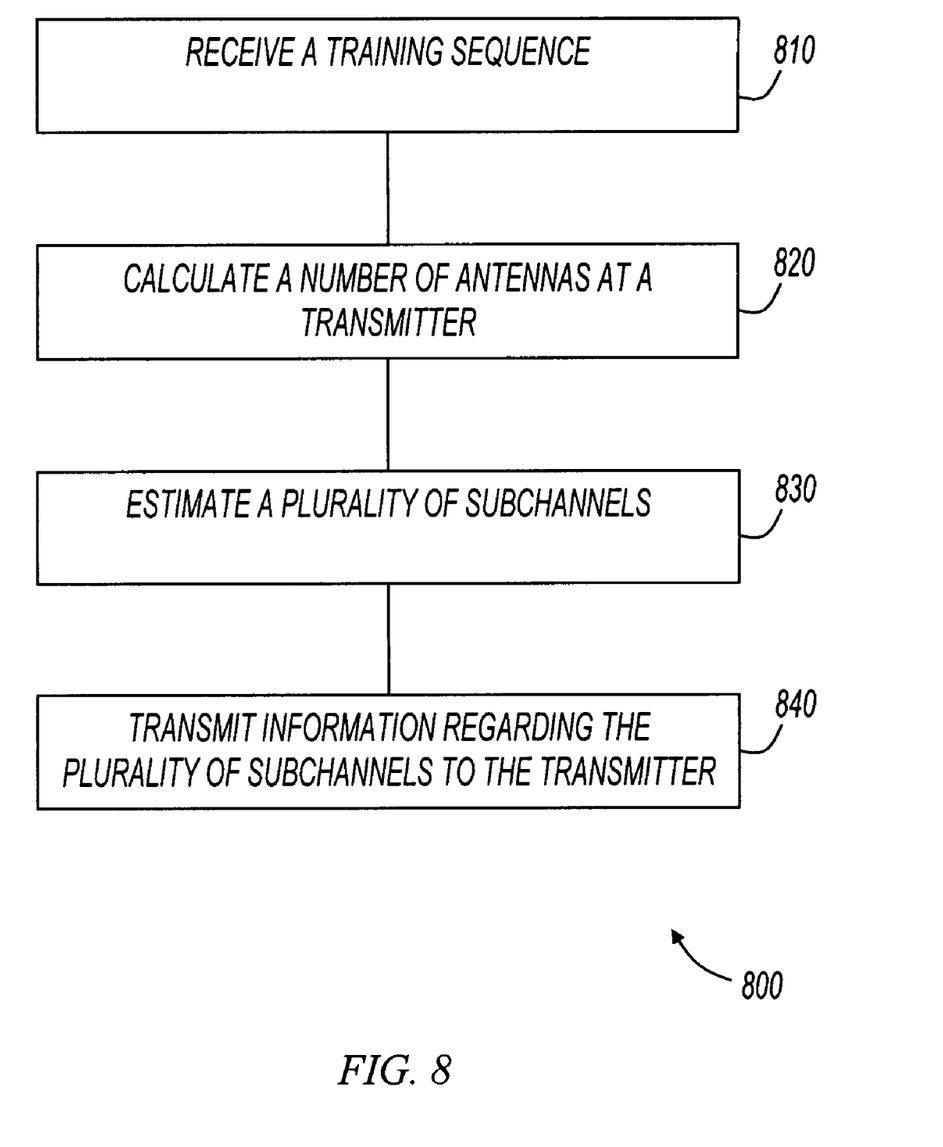

Processor 660 may perform method embodiments of the present invention, such as method 700 (FIG. 7) or method 800 (FIG. 8). Processor 660 represents any type of processor, including but not limited to, a microprocessor, a digital signal processor, a microcontroller, or the like.

Memory 670 represents an article that includes a machine readable medium. For example, memory 670 represents a random access memory (RAM), dynamic random access memory (DRAM), static random access memory (SRAM), read only memory (ROM), flash memory, or any other type of article that includes a medium readable by processor 660. Memory 670 may store instructions for performing the execution of the various method embodiments of the present invention.

Ethernet interface 650 may provide communications between electronic system 600 and other systems. For example, in some embodiments, electronic system 600 may be an access point that utilizes Ethernet interface 650 to communicate with a wired network or to communicate with other access points. Some embodiments of the present invention do not include Ethernet interface 650. For example, in some embodiments, electronic system 600 may be a network interface card (NIC) that communicates with a computer or network using a bus or other type of port.

FIG. 7 shows a flowchart in accordance with various embodiments of the present invention. In some embodiments, method 700 may be used by a station to communicate using OFDM-MIMO or OFDM-SDMA. In some embodiments, method 700, or portions thereof, is performed by an access point, a processor, or an electronic system, embodiments of which are shown in the various figures. Method 700 is not limited by the particular type of apparatus, software element, or system performing the method. The various actions in method 700 may be performed in the order presented, or may be performed in a different order. Further, in some embodiments, some actions listed in FIG. 7 are omitted from method 700.

Method 700 is shown beginning at block 710 in which channel state information is received from a receiver. In some embodiments, channel state information may be in the form of pre-filtering matrices $\hat{V}_l^H$, l=1, . . . ,L. In other embodiments, channel state information may be in the form of information that describes whether the channel is suitable for OFDM-MIMO transmission or OFDM-SDMA transmission.

At 742, a multipath environment is estimated for each of a plurality of OFDM subchannels. At 744, a determination is made whether the multipath environment includes multiple uncorrelated paths for each of the pluraltiy of OFDM subchannels. If so, the transmitter is prepared at 746 to transmit using OFDM-MIMO format by pre-filtering using separate channel estimation data for each of the pluraltiy of OFDM subchannels, and transmission occurs at 760. This corresponds to Case 1, described above. If not, method 700 continues at 750.

At 750, a determination is made whether the multipath environment includes multiple uncorrelated paths for less than all of the plurality of OFDM subchannels. If so, the transmitter is prepared at 756 to transmit using OFDM-MIMO format by pre-filtering all OFDM subchannel data using channel estimation data from only one of the pluraltiy of OFDM subchannels, and transmission occurs at 760. This corresponds to Case 2, described above. If not, method 700 continues at 752.

At 752, the multipath environment includes multiple correlated paths for each of the pluraltiy of OFDM subchannels. The transmitter is prepared at 754 to transmit using OFDM-SDMA format, and transmission occurs at 760. This corresponds to Case 3, described above.

FIG. 8 shows a flowchart in accordance with various embodiments of the present invention. In some embodiments, method 800 may be used to communicate with parallel mobile stations using SDMA. In some embodiments, method 800, or portions thereof, is performed by an access point, a processor, or an electronic system, embodiments of which are shown in the various figures. Method 800 is not limited by the particular type of apparatus, software element, or system performing the method. The various actions in method 800 may be performed in the order presented, or may be performed in a different order. Further, in some embodiments, some actions listed in FIG. 8 are omitted from method 800.

Method 800 is shown beginning at block 810 in which a training sequence is received. In some embodiments, a training sequence such as training sequence 300 (FIG. 3) may be received by a station such as station 102 or station 104 (FIG. 1). At 820, a number of antennas at the transmitter is calculated. For example, station 104 may receive the training sequence corresponding to training sequence 300, and from the training sequence may calculate that station 102 transmitted the training sequence using N antennas.

At 830, a plurality of subchannels are estimated. For example, channel matrices describing channel characteristics may be calculated for each of L subchannels. At 840, information regarding the plurality of subchannels is transmitted back to the transmitter. In some embodiments, this may correspond to transmitting information describing whether or not the subchannels are part of a rich scattering environment. In other embodiments, pre-filtering matrices are transmitted, and in still further embodiments, a single pre-filtering matrix may be transmitted.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
    estimating a multipath environment for each of a plurality of orthogonal frequency division multiplexing (OFDM) subchannels between a transmitter and a receiver;
    when the multipath environment includes multiple uncorrelated paths for each of the plurality of OFDM subchannels, preparing the transmitter to transmit using an OFDM multiple-input-multiple-output (MIMO) format by pre-filtering using separate channel estimation data for each of the OFDM subchannels;
    when the multipath environment includes multiple uncorrelated paths for less than all of the plurality of OFDM subchannels, preparing the transmitter to transmit using an OFDM-MIMO format by pre-filtering all OFDM subchannel data using channel estimation data from only one of the plurality of OFDM subchannels;
    when the multipath environment includes multiple correlated paths for each of the plurality of OFDM subchannels, preparing the transmitter to transmit using an OFDM spatial division multiple access (SDMA) format; and
    transmitting data from the transmitter.

2. The method of claim 1 wherein estimating a multipath environment between a transmitter and a receiver comprises:
    receiving at the receiver at least one OFDM symbol from each of N antennas at the transmitter.

3. The method of claim 2 wherein estimating the multipath environment further comprises calculating L subchannel matrices.

4. The method of claim 3 wherein estimating the multipath environment further comprises transmitting information regarding the L subchannel matrices from the receiver to the transmitter.

5. A method comprising:
    receiving channel state information corresponding to a plurality of orthogonal frequency division multiplexing (OFDM) subchannels;
    transmitting using an OFDM multiple input multiple output (MIMO) format wherein each OFDM subchannel is pre-filtered using channel state information corresponding to that OFDM subchannel if the channel state information indicates the existence of a rich multipath scattering environment for all OFDM subchannels;
    transmitting using an OFDM-MIMO format wherein all OFDM subchannels are pre-filtered using channel state information corresponding to a single OFDM subchannel if the channel state information indicates the existence of a rich multipath scattering environment for less than all OFDM subchannels; and
    otherwise transmitting using an OFDM spatial division multiple access (SDMA) format.

6. The method of claim 5 wherein receiving channel state information comprises receiving pre-filtering matrices from a receiver.

7. The method of claim 6 wherein transmitting using a OFDM-MIMO format comprises pre-filtering data using the pre-filtering matrices.

8. The method of claim 5 wherein transmitting using a OFDM-MIMO format wherein each OFDM subchannel is pre-filtered using channel state information corresponding to that OFDM subchannel if the channel state information indicates the existence of a rich multipath scattering environment comprises:
    determining if a plurality of subchannel matrices are strong full-rank matrices; and
    pre-filtering data with a plurality of matrices corresponding to the plurality of subchannel matrices.

9. The method of claim 5 wherein transmitting using a OFDM-MIMO format wherein all OFDM subchannels are pre-filtered using channel state information corresponding to a single OFDM subchannel if the channel state information indicates the existence of a rich multipath scattering environment for less than all OFDM subchannels comprises:
    determining if less than all of a plurality of subchannel matrices are strong full-rank matrices; and
    pre-filtering data with one singular matrix corresponding to one of the plurality of subchannel matrices.

10. The method of claim 5 wherein otherwise transmitting using an OFDM-SDMA format comprises:
    determining if a plurality of subchannel matrices are rank-one matrices; and
    weighting signals prior to transmission by N antennas.

11. The method of claim 5 further comprising transmitting a training sequence to the receiver.

12. The method of claim 11 wherein transmitting a training sequence comprises transmitting a plurality of OFDM symbols with N antennas simultaneously.

13. The method of claim 12 wherein transmitting a training sequence further comprises transmitting a second plurality of OFDM symbols with the N antennas non-simultaneously.

14. An apparatus having a computer-readable medium with instructions stored thereon that when accessed, result in a computer performing:
    configuring a transmitter to transmit using an orthogonal frequency division multiplexing multiple input multiple output (OFDM-MIMO) format by pre-filtering using separate channel estimation data for each of a plurality of OFDM subchannels when channel state information indicates the existence of a rich multipath scattering environment in each of the plurality of OFDM subchannels;
    configuring the transmitter to transmit using an OFDM-MIMO format by pre-filtering all of the plurality of OFDM subchannels using channel estimation data from only one of the plurality of OFDM subchannels when channel state information indicates the existence of a rich multipath scattering environment in less than all of the plurality of OFDM subchannels;

configuring the transmitter to transmit using an OFDM spatial division multiple access (SDMA) format when channel state information indicates the existence a strong line of sight component; and transmitting from the transmitter.

15. The apparatus of claim 14 wherein configuring the transmitter to transmit using a OFDM-MIMO format comprises:

applying substantially uniform weights to signals transmitted by a plurality of antennas.

16. The apparatus of claim 14 wherein configuring the transmitter to transmit using a OFDM-SDMA format comprises:

pre-filtering data using unity matrices; and applying beamforming weights to signals transmitted by a plurality of antennas.

* * * * *